April 25, 1950 F. J. SOMERS 2,505,589

COLOR TELEVISION SYSTEM

Filed Oct. 31, 1941 2 Sheets-Sheet 1

INVENTOR
Frank J. Somers
BY H. G. Grover
ATTORNEY

April 25, 1950 F. J. SOMERS 2,505,589

COLOR TELEVISION SYSTEM

Filed Oct. 31, 1941 2 Sheets-Sheet 2

INVENTOR
Frank J. Somers
BY H. G. Grover
ATTORNEY

Patented Apr. 25, 1950

2,505,589

UNITED STATES PATENT OFFICE 2,505,589

COLOR TELEVISION SYSTEM

Frank J. Somers, Rockville Centre, N. Y., assignor to Radio Corporation of America, a corporation of Delaware Application October 31, 1941, Serial No. 417,295

27 Claims. (Cl. 178—5.2)

Figure 1:
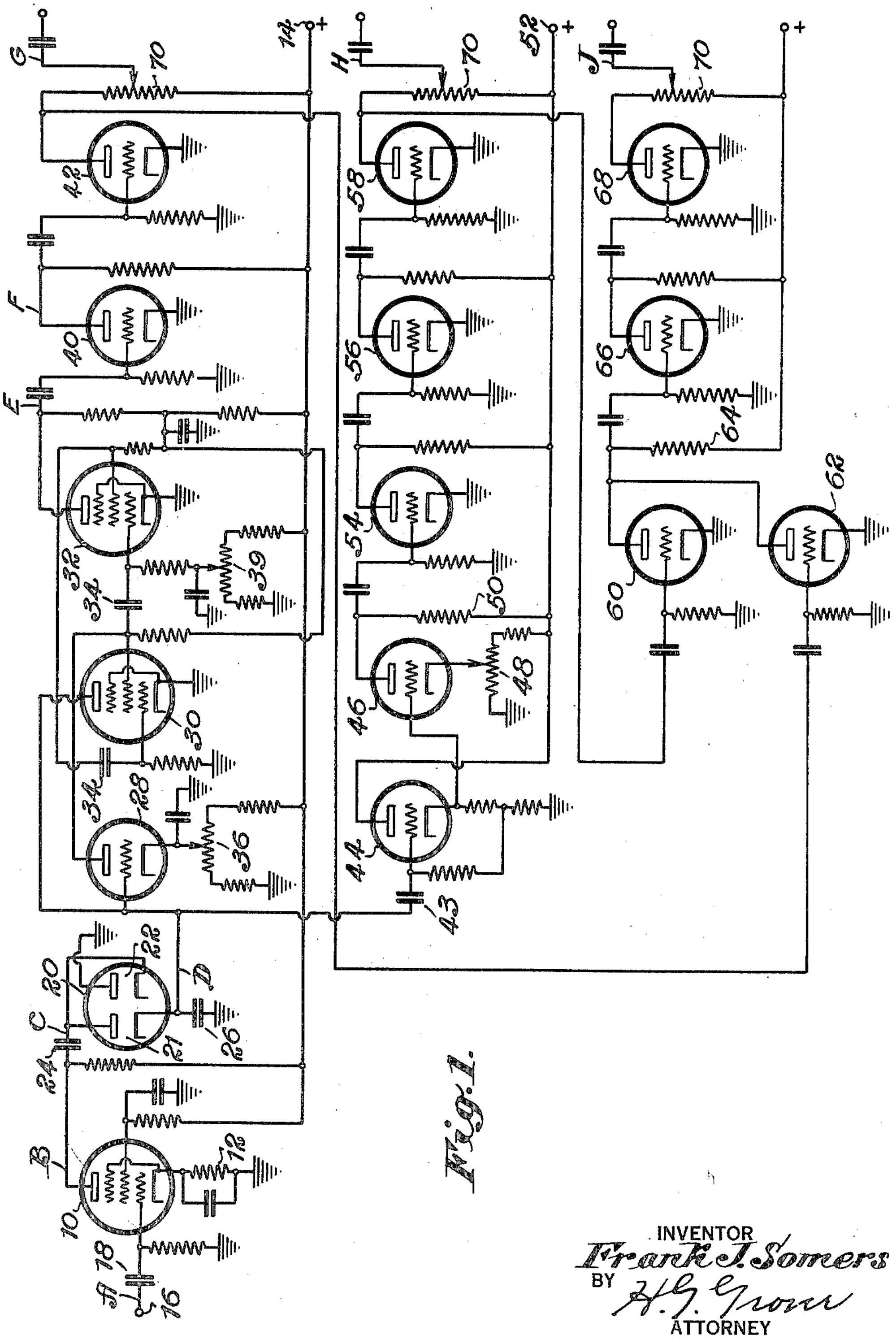

This invention relates to a television transmitter and more particularly to the transmission of television pictures in color.

Ordinarily, in the transmission of color images by television it is customary to transmit separate images or television frames in succession, the successive images or frames transmitted being representative of a particular color of the subject matter being transmitted. The transmitted signals are received at a television receiver and are then used to produce successive black and white images which are viewed through differently colored filters, the filters used being rotated or placed in front of the television receiver in rapid succession in synchronism with the transmission of the separate images and in synchronism with the movement of corresponding filters in the television transmitter. In the transmitter, a single television transmitting tube is used and optical images of the subject matter to be transmitted are projected upon the light sensitive electrode or photo-sensitive mosaic in the television transmitting tube through the use of color filters so that each successive scanning cycle in the television transmitting tube will produce picture signals corresponding in intensity to the light values of a particular color in the subject matter to be transmitted.

The light responsive electrode or the photo-sensitive mosaic which is used in the television transmitting tube does not always have completely uniform response in so far as color is concerned and in so far as the wave length of the light projector therein is concerned. Furthermore, the light transmission characteristics of the color filters used at the transmitter are not identical and the artificial light sources do not have the same output intensity as all light frequencies.

Accordingly, in the absence of some correcting means signals representing one color are either too strong or too weak in comparison with the signals representing another color to permit the production of a natural and desirable balance of color in the composite images produced at the television receiver. In a three-color television system it is generally customary to use red, green and blue filters and, in order to compensate for the response of the television transmitting tube, the difference in transmission characteristics of the filters and the artificial light output at these particular colors, some means must be provided in order that a properly balanced image may be produced at the receiver.

The present invention is therefore concerned with the provision of means for compensating for the lack of linearity in color response of the television transmitting tube and for likewise compensating for the lack of uniformity in the light transmitting characteristics of the filters.

Furthermore, this system provides means for compensating for the variations in light intensity in the studio in so far as the particular colors are concerned. The system disclosed herein will substantially completely compensate for the lack of uniformity in color response of the transmitting tube, for the lack of uniformity in light transmission of the various filters and for the non-linearity of color intensity in the source of light used in the studio.

Broadly, the desired results are accomplished in the present invention by varying the degree of amplification to which the produced picture signals are subjected to thereby cause the picture signals to be converted to their proper relative signal strengths in order that a properly color balanced image may be produced at the receiver. This variation in gain or amplification of the picture signals is accomplished in an electronic manner by altering the gain or amplification factor of one or more tubes in the picture signal amplifier channel. This cyclic variation in gain is accomplished through the use of an electron switch device, the electron switch device being operated by a series of control impulses which are derived from an impulse generating network.

The present invention, therefore, is also concerned with the network for producing the desired control impulses and the use of the impulses to operate an electron switching device whereby the gain of the picture signal amplifier may be varied in a predetermined manner.

It is therefore one purpose of the present invention to provide an impulse generating system which will produce impulses of a predetermined frequency and of a predetermined duration.

Another purpose of the present invention resides in the provision of an impulse generating means whereby three series of impulses may be produced each having the same frequency and the impulses of each series occupying substantially identical time intervals with the individual impulses of the three series displaced in phase relationship in order that the desired results may be accomplished.

Still another purpose of the present invention resides in the provision of means for utilizing the produced control impulses and for producing thereby a voltage variation for controlling the gain of a television picture signal amplifier.

A further purpose of the present invention resides in the provision of an electron switching device in which the composite output voltage variations are related to a fixed direct current level.

A still further purpose of the present invention resides in the provision of a picture signal amplifier channel in which push-pull operation is employed and in which the gain or amplification of two or more of the tubes in the picture signal channel may be varied in accordance with a voltage variation.

A still further purpose of the present invention resides in the use of a push-pull picture signa. amplifying channel with means for cyclically controlling the gain or amplification of the picture signals without the introduction of any spurious signals by reason of such control.

Figure 3:
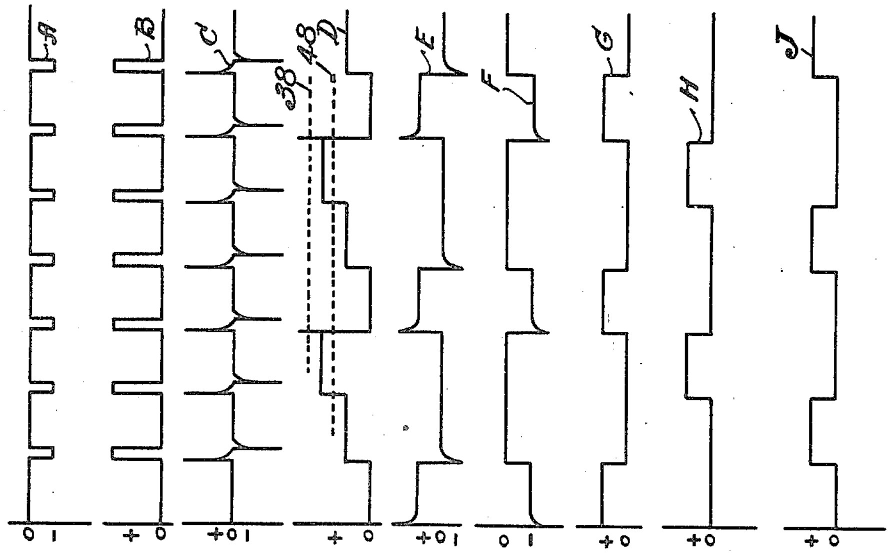
Figure 2:
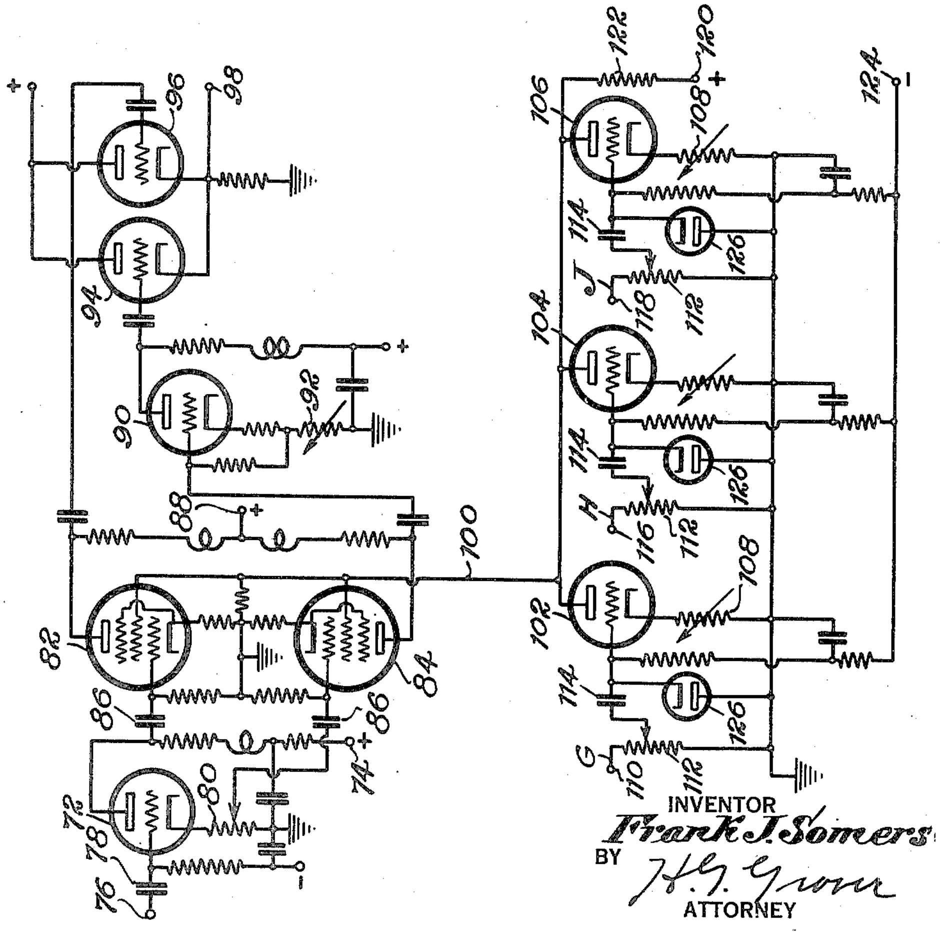

Still other purposes and advantages of the present invention will become more apparent to those skilled in the art from the following specification and claims particularly when considered with the drawings wherein:

Figure 1 shows schematically a preferred circuit arrangement for producing the desired control impulses, Figure 2 shows schematically an electron switching arrangement for varying the gain or amplification of a picture signal amplifier, and, Figure 3 shows a series of explanatory curves of voltage variations which appear at various points in the system shown in Figure 1.

Referring now to the drawings and particularly to Figure 1, there is shown schematically a preferred form of an impulse generating system. The system is to be used in a three-color television transmitting system in which the separate color components are changed for each vertical scanning cycle. In other words, a different color component of the composite television image is presented for each field scanned. Therefore, if the field frequency of the color television system is 120 cycles per second then each individual color of the composite color television image is scanned 40 times per second. For the purpose of describing the operation of this invention, it will be assumed that the television field frequency is 120 and that three separate colors are used.

The impulse generating system shown in Figure 1 includes an amplifying tube 10 which is preferably of the screen grid type and which includes at least a cathode, a control electrode and an anode. The cathode of tube 10 is connected to ground by cathode resistance 12 which is bypassed by an appropriate condenser and the anode is maintained positive with respect to its associated cathode by means of a load resistance connected between the anode and terminal 14 to which a source of positive potential is connected. The control electrode of tube 10 is connected to ground through an appropriate grid resistance and negative impulses of television field frequency are applied to the terminal 16 in order that they may be impressed upon control electrode of tube 10 by way of condenser 18. These impulses may be of the form shown in curve A of Figure 3. Since tube 10 functions as an amplifier tube, these same voltage variations appear at the anode of tube 10 with their polarity reversed so that the separate impulses extend in a positive direction as indicated by curve B of Figure 3.

In the circuit an electron impulse counter device is provided which includes a double diode tube 20. The anode of diode 21 and the cathode of diode 22 are connected together and are coupled to the anode of tube 10 by way of a relatively small condenser 24. The anode of diode 22 is connected directly to ground whereas the cathode of diode 21 is connected to ground through a condenser 26.

In view of the fact that the condenser 24 is relatively small a certain differentiating effect is produced so that the voltage variations appearing at the anode of diode 21 and the cathode of diode 22 may be of the form shown in curve C of Figure 3. The voltage variations which extend in a negative direction are substantially eliminated through the shorting effect of the diode 22 where they are passed to ground whereas the voltage variations which appear in a positive direction operate to produce a charge on condenser 26. Each time an impulse is applied to the control electrode of tube 10, the voltage variations which appear at the anode of diode 21 cause a positive charge to accumulate on the condenser 26. Unless this charge is removed it will continue to accumulate in a stepwise fashion as indicated in the curve shown at D in Figure 3 until it is approximately equal to the peak positive portion of the wave shown at C in Figure 3.

The circuit also includes a discharge tube 28 which includes an anode, a cathode and a control electrode. The circuit also includes a multivibrator circuit comprising tubes 30 and 32 which are preferably of the screen grid type. The cathodes of tubes 30 and 32 are connected to ground while the control electrode of each is connected to the screen grid electrode of the other by means of coupling condensers 34. The screen grid electrode of tube 30 is also connected to the anode of tube 28 and the anode of tube 30 is connected to the cathode of diode 21 and to the control electrode of tube 28. The cathode of tube 28 is normally maintained at a positive potential with respect to ground by means of a potentiometer 36 and in view of this positive potential, tube 28 is normally non-conductive but is rendered conductive when the potential applied to its control electrode is made sufficiently positive.

Inasmuch as the control electrode of tube 28 is connected to the cathode of diode 21, the control electrode is maintained at a potential corresponding to the charge on condenser 26. As this charge increases in a positive direction in a stepwise manner, as explained above, eventually the potential of the control electrode of tube 28 will reach a point where the tube is rendered conductive. This point is determined by the setting of potentiometer 36 and for best operations is chosen such that the tube 28 will become conductive when the charge potential on condenser 26 reaches a point represented by the dotted line 38 which is applied to curve D in Figure 3. If the tube 28 is to become conductive on the third charging impulse (as shown in Figure 3) then the bias of the tube should be such as will prevent operation of the tube until after two charging impulses. The bias should then be set at a value corresponding to a potential about half way between the potentials produced by two and three charging impulses. Since the screen grid electrode of tube 30 is connected to the anode of tube 28, and the anode of tube 30 is connected to the cathode of diode 21, conduction of tube 28 also initiates a conduction in the plate circuit of tube 30 which permits the charge on condenser 26 to be substantially completely removed by current flow through tubes 28 and 30. It will be noticed that the source of positive potential of the plate of tube 30 is derived only from the charge on condenser 26 and by reason of the circuit arrangement just defined, the plate circuit of tube 30 is permitted to become conductive only when its screen grid is supplied with an impulse from tube 28.

Tubes 30 and 32 function as a multi-vibrator and are made alternately conducting and nonconducting by reason of their particular connections and, inasmuch as multi-vibrators are well known in the art, these connections will not be specifically described herein.

Since the alternate operation of tubes 30 and 32 is controlled by the charge on condenser 26, the voltage variations appearing at the anode of tube 32 will therefore have a frequency of 40 impulses per second (assuming 120 impulses per second are applied to terminal 16 and assuming that each third impulse causes operation of multivibrator tubes 30 and 32). A potentiometer 39 is provided for adjusting the width of these impulses so that their duration will be 1/120 second. Voltage variations appearing at the anode of tube 32 will then have a wave form such as shown in curve E in Figure 3. This wave form is substantially rectangular but includes certain undesired signals or irregularities which for best operation of the system should be eliminated. These voltage variations are then applied to the control electrode of tube 40, the bias on the tube being such that the undesired negative peaks shown in curve E are eliminated since tube 40 is rendered non-conductive at such time.

There therefore appears in the anode of tube 40 a voltage variation such as indicated in curve F in Figure 3 and to eliminate the undesired peaks associated with this substantially rectangular voltage variation, the impulses are applied to tube 42 so that at the anode of tube 42 are present impulses such as shown at curve G in Figure 3. The voltage variations available at the anode of tube 42 include, therefore, only impulses of rectangular wave form, the impulses occurring at the rate of 40 per second and each having a duration corresponding to 1/120 of a second.

The cathode of diode 21, as stated above, has a voltage variation such as indicated at curve D in Figure 3. These voltage variations are applied through condenser 43 to the control electrode of tube 44 and the load circuit of tube 44 is connected between ground and the cathode of the tube so that the output of tube 44 may be derived from its cathode. The voltage variations appearing at the cathode of tube 44 are therefore substantially identical to those appearing at the cathode of diode 21. These voltage variations are then applied to the control electrode of tube 46 which includes at least a cathode, a control electrode and an anode. The potential of the cathode is made positive by a predetermined amount as determined by the setting of potentiometer 48 so that the tube is normally non-conductive but is rendered conductive when the potential of its control electrode is made sufficiently positive. Normally, the potential of the cathode of tube 46 is so adjusted that the tube will be rendered conductive at a potential such as that indicated by the dotted line 48 shown associated with curve D of Figure 3. The anode of tube 46 is maintained positive by a load resistance 50 which is connected between the anode terminal 52 to which a source of positive potential is applied. There therefore appears at the anode of tube 46 a voltage variation which is substantially rectangular in wave form and which has a frequency of 40 impulses per second. These impulses have a duration of 1/120 of a second since impulses of this frequency are applied to the input terminal 16. After appropriate amplification and clipping by means of tubes 54, 56 and 58 there will be produced at the anode of tube 58 a voltage variation such as that shown in curve H of Figure 3. It will be noticed that the voltage variations of curve H are similar to those of curve G but are displaced in phase relationship such that the impulses available at tube 58 precede the voltage variations available at tube 42 by 1/120 of a second.

For producing the third series of impulses, a pair of tubes 60 and 62 are used, each of which includes a cathode, a control electrode and an anode. The cathodes are connected to ground whereas the control electrodes are supplied with the produced voltage variations from tubes 42 and 58. The output from tube 42 is applied to the control electrode of tube 62 whereas the output from tube 58 is applied to the control electrode of tube 60. The anodes of these tubes are connected together and have a common anode resistance 64 by means of which the anodes are maintained positive with respect to the cathodes. Since the impulses available at the anodes of tubes 42 and 58 extend in a positive direction as indicated by the curves G and H of Figure 3, tubes 62 and 60, respectively, are rendered conductive during these intervals. During the remaining interval when no positive impulses are applied to the control electrodes of either of tubes 60 and 62 neither are conductive and, accordingly, a voltage variation will appear at the anodes of tubes 60 and 62 which is of rectangular form with the impulses of the voltage variations extending in a positive direction and each occurring during the intervals when no impulses are supplied by either of tubes 42 or 58. After appropriate amplification and clipping in tubes 66 and 68, there then appears a voltage variation at the anode of tube 68 similar to that shown by curve J of Figure 3. These voltage variations are similar to the voltage variations available at tubes 42 and 58 except that the impulses constituting the voltage variations are displaced in phase relationship.

There are then available from the anodes of tubes 42, 58 and 68 voltage variations of rectangular wave form having a frequency of 40 impulses per second each having a duration of 1/120 of a second and each displaced by 120 electrical degrees. These control impulses may then be used to control an electron switching device for varying the gain or amplification of a picture signal amplifier tube.

In order that these voltage variations may be adjustable as to intensity, a potentiometer 70 is associated with each of tubes 42, 58 and 68 and the output potential variations are derived from the movable contacts of these potentiometers.

In Figure 2 is shown the electron switching arrangement which operates in response to the voltage variations produced by the circuit shown in Figure 1 and which is effective to control or vary the gain or amplification of tubes used in the picture signal amplifier. The picture signal amplifier includes an initial amplifying tube 72 having a cathode, a control electrode and an anode. This tube operates as a phase inverter since load resistances are included between cathode and ground as well as between a source of positive potential 74 and the anode of the tube. When television picture signals are applied to the terminal 76 they are impressed upon the control electrode of tube 72 by way of coupling condenser 78 and similar voltage variations may be derived from both the anode and cathode of tube 72, the voltage variations available at these points bearing an out-of-phase relationship with respect to each other. In order that the voltage variations appearing at the anode may be of the same intensity as the voltage variations derived from the cathode, a potentiometer 80 is included in the cathode circuit for adjusting and balancing the voltage intensity of the two output voltage variations.

A pair of push-pull amplifier tubes 82 and 84 are provided which preferably are of the screen grid type and which include also a cathode, a control electrode and an anode. The control electrodes of tubes 82, and 84 are supplied with picture signals from the anode and cathode respectively of tube 72 by way of coupling condensers 86. Since these voltage variations are of substantially the same intensity but bear an out-of-phase relationship with respect to each other, tubes 82 and 84 operate as a push-pull amplifier. The anodes of the tubes are maintained positive with respect to their cathodes by appropriate anode load means connected between the anodes and a positive terminal 88. For converting the push-pull signals into single voltage variations, a tube 90 is used, the control electrode of tube 90 being supplied with voltage variations from the anode of tube 84. This tube operates as a phase inverter and does not increase the intensity of the signals passed therethrough. In order that the voltage variations of the output from tube 90 shall have the same intensity as the voltage variations available at the anode of tube 82, an adjustable resistance 92 is provided in the cathode circuit of tube 90. The voltage variations from the anode of tube 90 and from the anode of tube 82 are then adjusted to be of the same intensity and phase relationship and are fed in parallel to two parallel operated amplifying tubes 94 and 96. The output of these tubes is derived from their cathodes so that an amplifying picture signal may be derived from the terminal 98.

For compensating for the above described undesired conditions which exist in three-color television systems, the gain or amplification of tubes 82 and 84 is varied by applying a varying potential to the conductor 100 which is connected to the screen grid electrodes of these tubes. This potential variation is derived from an electron switching device which includes tubes 102, 104 and 106. All of these tubes include a cathode, a control electrode and an anode and the cathodes of each of the tubes is connected to ground through a separate adjustable resistance 108. The control electrode of tube 102 is supplied with voltage variations or control impulses such as shown in curve G of Figure 3. These control impulses are applied to the terminal 110 and in order that their intensity may be varied, a potentiometer 112 is provided. The movable contact of the potentiometer 112 is coupled to the control electrode of tube 102 by a coupling condenser 114. Similarly the control impulses such as shown at curve H in Figure 3 are applied to terminal 116 and to the control electrode of tube 104 whereas potential voltage variations of the form shown by curve J in Figure 3 are applied to terminal 118 and to the control electrode of tube 106. Since these three voltage variations or control impulse series have a frequency of 40 impulses per second, the impulses of the three control impulse series being displaced 120 degrees, tubes 102, 104 and 106 are rendered sequentially conductive to produce voltage variations at their anodes. The anodes of all of the tubes 102, 104 and 106 are connected together and are connected to terminal 120 by means of load resistance 122. The terminal 120 is supplied with a source of positive potential. In order that the control electrodes may be operated at their proper potential, separate control electrodes or grid resistances are connected between the control electrodes and a source of negative potential that is applied to terminal 124.

The voltage variations which appear at the anodes of tubes 102, 104 and 106 and which are impressed upon conductor 100 are determined in accordance with the intensity of the impulses which are applied to the control electrodes of the tubes respectively. If the picture signals representing a particular color, for example red, require less amplification than picture signals representing the other colors, then the impulses which occur during the scanning of the red optical image are increased in intensity and are applied to the corresponding electron switching tube resulting in a decrease of screen voltage on tubes 82 and 84 and a correspondingly lower amplification of the video signal corresponding to red. If it is assumed that the impulses represented by the curve G occur during the scanning of the red optical image, then the intensity of these voltage variations as applied to tube 102 is made greater than the intensity of the voltage variations applied to tubes 104 and 106 corresponding, for example, to the green and blue picture images. Accordingly, there will be present in conductor 100 a cyclically varying voltage variation which is determined by the setting of the potentiometers associated with the control electrodes of tubes 102, 104 and 106 and these voltage variations, when impressed upon the screen grid electrodes of tubes 82 and 84, will effect a variation in the gain or amplification of these tubes. When a proper adjustment of the input potentiometers of tubes 102, 104 and 106 is made, then the gain or degree of amplification of the picture signals representing the various three colors may be altered in such a manner that a properly color balanced image will be produced at the television receiver.

In order that the voltage variations appearing at conductor 100 will be related to a common base or will have a common direct current axis, the cathode resistances of tubes 102, 104 and 106 are made adjustable and there is included between the control electrode of each of these tubes and ground a diode 126, the anodes of the diodes being connected to ground and the cathodes being connected to the control electrodes. Through the action of the diodes, the coupling condensers 114 are charged up to a potential equal to the excursions in the negative direction from the A. C. axis of the impulses applied to the grids of tubes 102, 104 and 106. Hence the negative extremities of these waves are referred to a fixed direct current potential. Therefore, except for slight differences due to variations in the trans-conductances of the individual tubes 102, 104 and 106, the positive extremities of the impulse voltages measured across the common plate load resistor 122, will be held at a fixed D. C. potential with respect to ground. In order to correct for slight variations in transconductance, occurring in the manufacture or because of aging of tubes 102, 104 and 106, each of these tubes is provided with a variable cathode resistor which can be individually adjusted when the circuit is first set up, and thereafter requires little or no attention. The operation of these diodes as described makes it possible to adjust the amplification of any individual color by means of potentiometers 112 without affecting the amplification obtained for the other colors.

The single channel picture signal amplifier is converted into a dual channel or push-pull amplifier at tubes 82 and 84 in order that no spurious signals will be introduced into the picture signal by reason of the potentials which are applied to the picture signal amplifier tubes for controlling the gain of the tubes. If a single amplifier tube is used, the gain of which is controlled in accordance with the potential of one of the electrodes in the tube, then it is not uncommon that spurious signals will be introduced in the picture signal series by reason of the voltage variations which are impressed upon the gain control electrode of that tube. When the picture signals are converted into push-pull signals and when push-pull amplifiers such as 82 and 84 are used, these spurious signals are not introduced since the gain control potentials are impressed upon push-pull operated tubes in an in-phase relationship and as a result of this, and the subsequent conversion to a single ended output at terminal 98, all spurious signals are canceled in the amplifier and are not present at the output of tubes 94 and 96. Through the use of the push-pull stage, it is therefore possible to control the amplification of tubes 82 and 84 by varying the potential of one of the electrodes of the tubes without introducing into the picture signal undesired spurious signals.

Through the use of the present invention it is possible to develop three series of control impulses of identical frequency and duration, the impulses of each series being displaced 120 electrical degrees with respect to each other. Furthermore, through the use of the electron switching arrangement in the picture signal amplifier as shown in Figure 2, it is possible to use these control impulses to alter the gain of a picture signal amplifier in order that a properly color balanced television picture may be transmitted and reproduced at the receiver. By regulating the intensity of the control impulses which are applied to the tubes of the electron switching circuit, it is possible to vary the gain of the picture signals between successive field scannings in order that the picture signals representative of all of the three colors may bear the proper intensity relationship with respect to each other. When the control impulses have been set at the proper intensity, it is then possible to compensate for the lack of linearity of color response of the transmitting tube, the lack of uniformity of transmission characteristics of the filters and the lack of uniformity in the color of spectrum of the light used in a television studio.

Although the invention as described is applicable to a television system operating at 120 fields per second, it is entirely conceivable that the same invention may be used for any other repetition rate. Furthermore, it is immaterial what particular type of apparatus is used in the studio since picture signals may be derived from any type television camera.

Various other alterations and modifications of the present invention may become apparent to those skilled in the art and it is desirable that any and all such modifications and alterations be considered within the purview of the present invention except as limited by the hereinafter appended claims.

I claim:

1. A television transmitting system wherein a series of picture signals are produced comprising a single picture signal amplifying channel, means for generating a plurality of series of impulses, the impulses of each series having a common frequency and time duration, and the impulses of each series being displaced from the impulses of the other series by a predetermined amount so that the impulses occur in a predetermined sequence, and means for cyclically controlling the degree of amplification of the picture signals by the single amplifying channel in accordance with the sequentially occurring impulses.

2. A television transmitting system wherein a series of picture signals are produced comprising a single picture signal amplifying channel for continuously amplifying the picture signals, means for generating a plurality of series of impulses, the impulses of each series having a common frequency and time duration, and the impulses of each series being displaced from the impulses of the other series by a predetermined interval so that the impulses of the plurality of the series of impulses occur in a predetermined sequence, and means for cyclically controlling the effectiveness of the single picture signal amplifying channel by the plurality of series of impulses.

3. A television transmitting system wherein a series of picture signals are produced representing successive television fields comprising a single channel amplifier for increasing the intensity of the picture signals, means for generating a plurality of series of impulses having a predetermined common frequency and time duration, the time duration of the impulses of each series corresponding to the time represented by each television field, and means for cyclically controlling the amplification of the picture signals by the single amplifying channel in accordance with the generated plurality of series of impulses.

4. A television transmitting system for transmitting color television images wherein a series of picture signals are produced corresponding to successive television fields representative of successively different color values of the television image comprising a television picture signal amplifier including an electron discharge tube, means for producing a plurality of series of impulses, the impulses of each of the plurality of series having a common frequency and time duration and the impulses of each series being displaced by a predetermined amount with respect to the impulses of the other series so that the impulses occur in a predetermined sequence, means for independently varying the intensity of each series of impulses, and means for cyclically controlling the gain of the electron discharge tube in the picture signal amplifier in accordance with the intensity of the sequentially occurring impulses.

5. A television transmitting system for transmitting color television images wherein a series of picture signals is produced corresponding to successive television fields representative of $n$ successively different primary color values of the television image comprising a television picture signal amplifier including an electron discharge tube, means for producing $n$ series of control impulses, the impulses of each of the $n$ series of impulses having a common frequency equal to $1/n$ times the television field repetition rate and a time duration equal to the television field repetition rate, the impulses of each series being displaced by $360/n$ electrical degrees with respect to the impulses of the other series, means for independently varying the intensity of each series of impulses, and means for cyclically controlling the gain of the electron discharge tube in the picture signal amplifier in accordance with the intensity of each series of impulses.

6. A television transmitting system for transmitting color television images wherein a series of picture signals is produced corresponding to successive television fields representative of three successively different primary color values of the television image, wherein the television field repetition rate is $f$ cycles per second, comprising a television picture signal amplifier including an electron discharge tube, means responsive to an original series of impulses having a frequency of $f$ cycles per second to product a first series of impulses having a frequency of $f/3$ cycles per second and a time duration of $1/f$ seconds, means responsive to said original series of impulses for producing a second series of impulses of a frequency of $f/3$ cycles per second and a time duration of $1/f$ seconds, means responsive to said first and second series of impulses for producing a similar third series of impulses, the impulses of each of the three series of impulses being displaced 120 electrical degrees with respect to the impulses of each other series of impulses, means for independently varying the intensity of each of the three series of impulses and means for cyclically controlling the gain of the electron discharge tube in the picture signal amplifier in accordance with the intensity of each series of impulses.

7. A television transmitting system for transmitting color television images wherein a series of picture signals is produced corresponding to successive television fields representative of successively different color values of the television image comprising a television picture signal amplifier including an electron discharge tube, means for producing a plurality of series of impulses, the impulses of each of the plurality of series having a common frequency corresponding to the color repetition rate and a common time duration corresponding to the television field repetition rate, the impulses of each series being displaced by a predetermined amount with respect to the impulses of the other series, means for independently varying the intensity of each series of impulses, and means for cyclically controlling the gain of the electron discharge tube in the picture signal amplifier in accordance with the intensity of each series of impulses.

8. A television transmitting system for transmitting color television images wherein a series of picture signals are produced corresponding to successive television fields representative of successively different color values of the television image comprising a television picture signal amplifier including an electron discharge tube, means for producing a plurality of series of impulses, the impulses of each of the plurality of series having a common frequency corresponding to the color repetition rate and a common time duration corresponding to the television field repetition rate, the impulses of each series being displaced by an amount corresponding to the time duration of each television field with respect to the impulses of the other series, means for independently varying the intensity of each series of impulses, means for producing a cyclically varying voltage variation from the intensity controlled and combined series of impulses, and means for controlling the gain of the electron discharge tube in the picture signal amplifier in accordance with the produced voltage variations.

9. A circuit arrangement for producing $n$ series of impulses from a series of original impulses having the frequency of $f$ cycles per second comprising $n$ response channels, each of said response channels having means for producing a separate series of impulses having a frequency of $f/n$ cycles per second and each of the impulses having a time duration of $1/f$ seconds.

10. A circuit arrangement for producing three series of impulses from a series of original impulses having the frequency of $f$ cycles per second comprising three response channels, means in each of said response channels for producing a separate series of impulses having a frequency of $f/3$ cycles per second and each of the impulses having a time duration of $1/f$ seconds.

11. A circuit arrangement for producing $n$ series of impulses from an original series of impulses having a frequency of $f$ cycles per second comprising $n$ separate response channels, means in each response channel for producing a series of impulses having a frequency of $f/n$ and a time duration of $1/f$ seconds, and means in each channel whereby the impulses of each produced series will be displaced $360/n$ electrical degrees with respect to the impulses of each adjacent series of impulses.

12. A circuit arrangement for producing $n$ series of impulses from an original series of impulses having a frequency of $f$ cycles per second comprising $n$ separate response channels, means responsive to the original series of impulses for producing a series of impulses having a frequency of $f/n$ and a time duration of $1/f$ seconds in each response channel, and means in each channel whereby the impulses of each produced series will be displaced by integrals of $360/n$ electrical degrees with respect to the impulses of each of the other series of impulses.

13. A circuit arrangement for producing three series of impulses from an original series of impulses of $f$ cycles per second comprising means responsive to the original series of impulses to produce a first series of impulses having a frequency of $f/3$ cycles per second and a time duration of $1/f$ seconds, means responsive to said original series of impulses for producing a second series of impulses of a frequency of $f/3$ cycles per second and a time duration of $1/f$ seconds, and means responsive to said first and second series of impulses for producing a third series of impulses having a frequency of $f/3$ cycles per second and a time duration of $1/f$ seconds.

14. A circuit arrangement for producing three series of impulses from an original series of impulses having a frequency of $f$ cycles per second comprising means responsive to the original series of impulses to produce a first series of impulses having a frequency of $f/3$ cycles per second and a time duration of $1/f$ seconds, means responsive to said original series of impulses for producing a second series of impulses of a frequency of $f/3$ cycles per second and a time duration of $1/f$ seconds, means responsive to said first and second series of impulses for producing a third series of impulses having a frequency of $f/3$ cycles per second and a time duration of $1/f$ seconds, and means for displacing the impulses of each of the three series by 120 electrical degrees with respect to the impulses of each other series of impulses.

15. A system for producing three series of impulses for use in a color television transmitting system comprising means responsive to an initiating series of impulses having a frequency of $f$ cycles per second for producing a first series of impulses having a frequency of $f/3$ cycles per second and a time duration of $1/f$ seconds, additional means responsive to said initiating series of impulses to produce a second series of impulses having a frequency of $f/3$ cycles per second and a time duration of $1/f$ seconds, the impulses of said second series of impulses preceding the impulses of said first series of impulses by a phase relationship of 120 electrical degrees, and means responsive to said first and second series of impulses to produce a similar third series of impulses displaced 120 electrical degrees with respect to the first and second series of impulses.

16. A system for producing three series of impulses for use in a color television transmitting system comprising means responsive to an initiating series of impulses having a frequency of 120 cycles per second for producing a first series of impulses of substantially rectangular wave form and having a frequency of 40 cycles per second and a time duration of $^1/_{120}$ seconds, additional means responsive to said initiating series of impulses to produce a second series of impulses of substantially rectangular wave form and having a frequency of 40 cycles per second and a time duration of $^1/_{120}$ seconds, the impulses of said second series of impulses preceding the impulses of said first series of impulses by a phase relationship of 120 electrical degrees, and means responsive to said first and second series of impulses to produce a similar third series of impulses displaced 120 electrical degrees with respect to the first and second series of impulses.

17. An electron switching circuit comprising $n$ separate electron discharge tubes, each including a cathode, a control electrode and an anode, means for impressing control impulses upon the control electrode of each of the discharge tubes in succession to cause the discharge tubes to become individually and successivly conductive in a predetermined order, means including a common load impedance for maintaining the anodes of all of the tubes positive with respect to their associated cathodes, means for independently varying the bias potential applied to the control electrode of each tube, and a common output circuit coupled to the anodes of the discharge tubes.

18. An electron switching circuit for use in a color television transmitting system comprising three separate electron discharge tubes, each including a cathode, a control electrode and an anode, means for impressing control impulses of substantially rectangular wave form upon the control electrode of each of the three discharge tubes in succession to cause the three discharge tubes to become individually and consecutively conductive, means including a common anode load resistance for maintaining the anodes of all of the tubes positive with respect to their associated cathodes, means for independently varying the bias potential applied between the control electrode and cathode of each tube, means for independently varying the intensity of the impulses applied to each individual tube, and a common output circuit coupled to the anodes of the discharge tubes.

19. An electron switching circuit comprising a plurality of separate electron discharge tubes, each including a cathode, a control electrode and an anode, means for impressing separate control impulses upon the control electrode of each of the three discharge tubes in succession to cause the three discharge tubes to become individually and consecutively conductive, means including a common load resistance for maintaining the anodes of all of the tubes positive with respect to their associated cathodes, a separate unilateral conducting device connected between each control electrode and a point of fixed potential and a common output circuit coupled to the anodes of the discharge tubes.

20. An electron switching circuit comprising a plurality of separate electron discharge tubes, each including a cathode, a control electrode and an anode, means for impressing separate control impulses upon the control electrode of each of the three discharge tubes in succession to cause the three discharge tubes to become individually and consecutively conductive, means including a common load resistance for maintaining the anodes of all of the tubes positive with respect to their associated cathodes, means for independently varying the bias potential applied to the control electrode of each tube, a separate unilateral conducting device connected between each control electrode and a point of fixed potential and a common output circuit coupled to the anodes of the discharge tubes.

21. An electron switching circuit comprising $n$ separate electron discharge tubes, each including a cathode, a control electrode and an anode, means for impressing separate control impulses upon the control electrode of each of the discharge tubes in succession to cause the discharge tubes to become individually and successively conductive in a predetermined order, means including a common load impedance for maintaining the anodes of all of the tubes positive with respect to their associated cathodes, means for independently varying the bias potential applied to the control electrode of each tube, a diode having a cathode and an anode associated with each electron discharge tube, means for connecting the cathode of each diode to the control electrode of its associated tube, means for connecting the diode anodes to a point of fixed potential, and a common output circuit coupled to the anodes of the discharge tubes.

22. A system for amplifying television picture signals comprising a first electron discharge tube having a cathode, a control electrode and an anode, means including separate load resistances connected to the anode and to the cathode of said tube for maintaining said anode positive with respect to said cathode, means for applying a single series of television picture signals to the control electrode of said discharge tube whereby push-pull signals may be derived from the cathode and anode of said tube, a pair of push-pull amplifier tubes each including a cathode, a pair of control electrodes and an anode, means for coupling one control electrode of one of the push-pull amplifier tubes to the cathode of said first discharge tube, means for coupling one control electrode of the other push-pull amplifier tube to the anode of said first discharge tube, means including load impedances for maintaining the anodes of said push-pull amplifier tubes positive with respect to their cathodes, an output circuit coupled to the anode of each of the push-pull amplifier tubes, and means for impressing identical control potentials upon the other control electrode of each of the push-pull amplifier tubes whereby the gain or amplification of the push-pull amplifier tubes may be varied simultaneously by said control potentials.

23. A system for amplifying television picture signals comprising a first electron discharge tube having a cathode, a control electrode and an anode, means including separate load resistances connected to the anode and to the cathode of said tube for maintaining said anode positive with respect to said cathode, means for applying a single series of television picture signals to the control electrode of said discharge tube whereby push-pull signals may be derived from the cathode and anode of said tube, a pair of push-pull amplifier tubes each including a cathode, a pair of control electrodes and an anode, means for coupling one control electrode of one of the push-pull amplifier tubes to the cathode of said first discharge tube, means for coupling one control electrode of the other push-pull tube to the anode of said first discharge tube, means including load resistances for maintaining the anodes of said push-pull amplifier tubes positive with respect to their cathodes, an output circuit coupled to the anode of each of the push-pull amplifier tubes, and means for simultaneously impressing cyclically varying single phase control potentials upon the other control electrode of each of the push-pull amplifier tubes whereby the gain or amplification of the push-pull amplifier tubes may be varied simultaneously and identically by said control potentials.

24. In a color television system utilizing a color video signal comprising a plurality of color series of signal waves representing a corresponding plurality of different primary colors of an object field, the signal waves of said plurality of series alternating in sequence, the method of changing the color balance of said color video signal which comprises passing said color video signal through an amplifying channel whose amplification may be varied in accordance with an impressed control wave, and impressing a plurality of control waves having respective series of control pulses recurring at the frequencies of said plurality of color series of said signal waves on said amplifying channel to change the amplification thereof for one color series of signal waves with respect to the amplification for another color series, the amplification for both said one and said other color series yielding corresponding color series of signal waves in the output color video signal of the channel of substantial magnitude.

25. In a color television system utilizing a color video signal comprising a plurality of color series of signal waves representing a corresponding plurality of different primary colors of an object field, the signal waves of said plurality of series alternating in sequence, apparatus for changing the color balance in said color video signal which comprises an electronic amplifier tube stage having an input and an output circuit, means for supplying said color video signal to said input circuit, means for supplying a plurality of control waves each having a series of pulses recurring at the frequency of the signal waves of a corresponding color series, said pulses persisting substantially throughout the periods of the respective signal waves to said amplifier tube stage to control the amplification thereof, means for varying the relative magnitudes of said control waves, the control waves being substantially in phase with the respective color series of the color video signal, the magnitude of the control waves being selected to yield respective output color series of signal waves of substantial magnitude, whereby an output color video signal may be obtained in which said respective color series are similar to the corresponding color series in the input color video signal but of altered balance.

26. In a color television system utilizing a color video signal comprising a plurality of color series of signal waves representing a corresponding plurality of different primary colors of an object field, the signal waves of said plurality of series alternating in sequence, apparatus for changing the color balance in said color video signal which comprises an electronic amplifier tube stage having an input and an output circuit, means for supplying said color video signal to said input circuit, means for supplying a plurality of control waves equal in number to said plurality of color series, each control wave having a series of pulses recurring at the frequency of the signal waves of the corresponding color series and each pulse being of substantially constant magnitude for the duration of the corresponding signal wave to said amplifier tube stage to control the amplification thereof, variable means for controlling the relative magnitudes of said plurality of control waves, the control waves being in phase with the respective color series and the waves of each other series being of substantial magnitude in said output circuit, whereby an output color video signal similar to the input color video signal but of adjusted color balance may be obtained.

27. In a color television system utilizing a color video signal comprising a plurality of color series of signal waves representing a corresponding plurality of different primary colors of an object field, the signal waves of said plurality of series alternating in sequence, apparatus for changing the color balance in said color video signal which comprises an electronic vacuum tube having two control grids and an output circuit, means for supplying said color video signal to one of said control grids, means for supplying to the other of said control grids a control wave having a plurality of series of pulses, the pulses in each series recurring at the frequency of the signal waves of the corresponding color series and each pulse being of substantially constant magnitude for the duration of the corresponding signal wave, variable means for controlling the relative magnitudes of the plurality of series in said control wave, the series of pulses in said control wave being in phase with the respective color series and the magnitude of said color video signal and the series of said control wave being selected so that the waves of each corresponding color series are of substantial magnitude in said output circuit, whereby an output color video signal similar to the input color video signal but of adjusted color balance may be obtained.

FRANK J. SOMERS.

REFERENCES CITED

The following references are of record in the file of this patent:

UNITED STATES PATENTS

| Number | Name | Date |
|---|---|---|
| 1,873,785 | Ranger | Aug. 23, 1932 |
| 1,873,786 | Ranger | Aug. 23, 1932 |
| 2,006,346 | Curtis | July 2, 1935 |
| 2,021,743 | Nicolson | Nov. 19, 1935 |
| 2,040,954 | Roberts | May 19, 1936 |
| 2,145,332 | Bedford | Jan. 31, 1939 |
| 2,158,285 | Koch | May 16, 1939 |
| 2,185,635 | Kock et al. | Jan. 2, 1940 |
| 2,214,846 | Wilson | Sept. 17, 1940 |
| 2,231,668 | Hall et al. | Feb. 11, 1941 |
| 2,237,640 | Urtel | Apr. 8, 1941 |
| 2,294,820 | Wilson | Sept. 1, 1942 |
| 2,298,987 | Thomsen | Oct. 13, 1942 |
| 2,309,506 | Herbst | Jan. 26, 1943 |

OTHER REFERENCES

Electronics, Oct. 1940, pages 32 to 34, 73, 74.